Patented Nov. 3, 1936

2,059,599

UNITED STATES PATENT OFFICE 2,059,599

SOIL CONDITIONER

Charles Peter, Salt Lake City, Utah

No Drawing. Application November 22, 1933,
Serial No. 699,196

1 Claim. (Cl. 71—24)

This invention relates to a soil conditioner, and its principal objects are to provide:

First. A material which may be incorporated directly with soils used for agricultural purposes, in order to promote what may be called the digestive qualities thereof, which means that the conditioner shall make available for plant nutriment, such food elements which exist potentially in the soil, but which ordinarily are not in forms to be readily assimilated by plant organisms.

Second. A material which in the raw state may be readily obtained in almost all parts of the world, and the processing of which can be carried on at a moderate cost, so that the resultant finished product can be supplied at comparatively small expense.

Third. A product which is convenient to use, and which is free from offensive odors.

Fourth. An artificial substitute for organic matter, as represented by manures, leaf moulds and so on.

The present invention bears a certain developmental relation to the fertilizer which forms the subject of my U. S. Patent No. 1,931,296, issued October 17, 1933. In order to clearly differentiate the present invention from that of the said patent, it may be pertinent to mention the particular history of their development.

As a culmination of previous work, the patentee of said patent (the present applicant), in conjunction with the agricultural department of the United States Smelting, Mining and Refining Company, made extensive field tests with the now patented fertilizer at the experimental farm of the latter, during the planting and growing season of the year 1932, this farm being located in Salt Lake County, Utah.

These tests were extremely encouraging and brought out clearly the valuable properties of roasted coal when combined with nutritive elements, as a fertilizer. It had occurred to me that roasted coal might possibly be used as a soil conditioner apart from its combination with any fertilizing ingredients, and applied directly to the soil, the purpose being to unlock certain food elements which may be present naturally in the soil, and to provide a synthetic humus. The season of 1932 however, was too far advanced, to make test plantings with the roasted coal, used alone as a soil conditioner, so that I was unable to verify my belief at that time, and so did not feel justified in broadly disclosing the use of roasted coal as a soil conditioner per se in the application for said patent which was filed October 4, 1932. As a consequence, I was constrained to limit the claims of said patent to the use of roasted coal as an ingredient of a fertilizer.

During the spring of 1933, the International Smelting Company of Salt Lake City, became desirous of experimenting with my patented fertilizer in conjunction with my proposed soil conditioner, and thereupon arranged to make extensive field tests at their experimental farm at Bauer, Tooele County, Utah. The results of these tests, as recorded, follow and afford the basis of my present invention.

The tests were conducted on a strip of land 8 x 20 rods divided into eight equal plats, extending through an eight acre field of potatoes. This land had been planted to potatoes for three years previous, and had not had any fertilizer applied prior to this year. The soil is of a sandy clay loam, homogeneous throughout, and is on a gentle slope, but not too sloping to wash in watering. Potatoes were planted May 22, 23, 24, 1933, and harvested October 24, 25, 26, 1933.

Plat No. 1.
 Treble superphosphate_____ 125 lbs. per acre
 Applied on plat_____ 15.62 lbs.
 Total harvest weight_____ 882 lbs.
Plat No. 2.
 Treble superphosphate_____ 125 lbs. per acre
 Coal_____ 175 lbs. per acre
 Applied on plat_____ 37.5 lbs.
 Total harvest weight_____ 1096 lbs.
Plat No. 3.
Peter formula_____ 500 lbs. per acre
 (Patent No. 1,931,296)
 Applied_____ 62.5 lbs.
 Total harvest weight_____ 1081 lbs.
Plat No. 4.
 Sulphate of ammonia_____ 50 lbs. per acre
 Treble superphosphate_____ 125 lbs. per acre
 Applied_____ 21.9 lbs.
 Total harvest weight_____ 1084 lbs.
Plat No. 5.
 Sulphate of ammonia_____ 50 lbs. per acre
 Treble superphosphate_____ 125 lbs. per acre
 Coal, roast conditioner_____ 175 lbs. per acre
 Applied _____ 43.75 lbs.
 Total harvest weight_____ 1214 lbs.
Plat No. 6.
 Coal, roast conditioner_____ 175 lbs. per acre
 Applied _____ 21.9 lbs.
 Total harvest weight_____ 1308 lbs.
Plat No. 7.
 Coal, roast conditioner_____ 2000 lbs. per acre
 Applied _____ 250.0 lbs.
 Total harvest weight_____ 1307 lbs.
Plat No. 8.
 Check (no fertilizer of any kind)
 Total harvest weight_____ 1045 lbs.

The said tests are largely comparative, and serve to demonstrate the rapid and efficient action of the conditioner in unlocking a potential supply of plant food lying more or less dormant in the soil, as distinguished from its action upon the plant food ingredients of a prepared fertilizer.

It is significant that a commercial fertilizer, treble superphosphate, was used on Plat No. 1, while on Plat No. 2, the same quantity of treble superphosphate when used with my improved soil conditioner, caused a considerable increase in the harvest weight of the product.

In Plat No. 5 where sulphate of ammonia and treble superphosphate were applied together with my roasted coal conditioner, the yield was much greater than in Plat No. 4, where these two fertilizing elements were used alone.

The result in Plat No. 6 brings out distinctly the novelty of the present invention, in that the conditioner was used alone, and shows the highest harvest yield over any of the other plats, and this with an application of only 175 lbs. of conditioner to the acre.

The roasted coal greatly assists the assimilative powers of plants. This property is distinctly shown when the results obtained from Plat 6 are compared with those obtained from Plat 8. The former show almost 30 per cent more yield than the latter, due to the application of 175 pounds soil conditioner to the acre. The greater amount of plant nutriment necessary, was evidently present in the soil in a form ordinarily unavailable for plant growth.

The soil conditioner is preferably prepared by grinding coal so it will pass a screen of 40 to 70 mesh and roasting this ground coal at a temperature preferably between 300 and 400 degrees Fahrenheit.

The term coal as herein used, may mean cannel, lignite, sub-bituminous, bituminous, or anthracite as the case may be; while the salt is preferably rock salt, containing about 95 per cent NaCl.

Having fully described my invention, what I claim is:

A soil conditioner, consisting of coal ground to pass a screen of approximately 40 to 70 mesh and roasted at a temperature approximately between 300 degrees and 400 degrees Fahr.

CHARLES PETER.